(12) United States Patent
Jain et al.

(10) Patent No.: US 11,343,229 B2
(45) Date of Patent: May 24, 2022

(54) MANAGED FORWARDING ELEMENT DETECTING INVALID PACKET ADDRESSES

(71) Applicant: VMware, Inc., Palo Alto, CA (US)

(72) Inventors: Rahul Jain, Sunnyvale, CA (US); Mukesh Hira, Palo Alto, CA (US); Su Wang, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 592 days.

(21) Appl. No.: 16/022,657

(22) Filed: Jun. 28, 2018

(65) Prior Publication Data

US 2020/0007497 A1 Jan. 2, 2020

(51) Int. Cl.
| | |
|---|---|
| G06F 21/00 | (2013.01) |
| H04L 29/06 | (2006.01) |
| G06F 9/455 | (2018.01) |
| G06F 9/50 | (2006.01) |

(52) U.S. Cl.
CPC ...... H04L 63/0236 (2013.01); G06F 9/45558 (2013.01); *G06F 2009/45595* (2013.01)

(58) Field of Classification Search
CPC ............. H04L 63/0236; H04L 63/1466; G06F 9/45558; G06F 2009/45595
See application file for complete search history.

(56) References Cited

U.S. PATENT DOCUMENTS

| | | |
|---|---|---|
| 6,108,300 A | 8/2000 | Coile et al. |
| 6,832,238 B1 | 12/2004 | Sharma et al. |
| 7,107,360 B1 | 9/2006 | Phadnis et al. |
| 7,360,245 B1 | 4/2008 | Ramachandran et al. |

(Continued)

FOREIGN PATENT DOCUMENTS

| | | |
|---|---|---|
| CN | 1792062 A | 6/2006 |
| CN | 101764752 A | 6/2010 |

(Continued)

OTHER PUBLICATIONS

Franziska Lichtblau, Florian Streibelt, Thorben Kruger, Philipp Richter, Anja Feldmann; "Detection, classification, and analysis of inter-domain traffic with spoofed source IP addresses"; IMG '17: Proceedings of the 2017 Internet Measurement Conference; Nov. 2017; pp. 86-99 (Year: 2017).*

(Continued)

*Primary Examiner* — Kendall Dolly
*Assistant Examiner* — Courtney D Fields
(74) *Attorney, Agent, or Firm* — Adeli LLP (57) ABSTRACT

Some embodiments provide a method for a managed forwarding element (MFE) executing on a data compute node (DCN) that operates on a host computer in a public datacenter. The MFE implements a logical network that connects multiple DCNs within the public datacenter. The method receives a packet, directed to the DCN, that (i) has a first logical network source address and (ii) is encapsulated with a second source address associated with an underlying public datacenter network. The method determines whether the first logical network source address is a valid source address for the packet based on a mapping table that maps logical network addresses to underlying public datacenter network addresses. When the first source address is not a valid source address for the packet, the method drops the packet.

18 Claims, 7 Drawing Sheets

(56) References Cited

U.S. PATENT DOCUMENTS

| | | |
|---|---|---|
| 7,423,962 B2 | 9/2008 | Auterinen |
| 7,523,485 B1 | 4/2009 | Kwan |
| 7,953,895 B1 | 5/2011 | Narayanaswamy et al. |
| 8,264,947 B1 | 9/2012 | Tavares |
| 8,296,434 B1 | 10/2012 | Miller et al. |
| 8,432,791 B1 | 4/2013 | Masters |
| 8,514,868 B2 | 8/2013 | Hill |
| 8,719,590 B1 | 5/2014 | Faibish et al. |
| 8,902,743 B2 | 12/2014 | Greenberg et al. |
| 8,958,293 B1 | 2/2015 | Anderson |
| 9,137,209 B1 | 9/2015 | Brandwine et al. |
| 9,244,669 B2 | 1/2016 | Govindaraju et al. |
| 9,356,866 B1 | 5/2016 | Sivaramakrishnan et al. |
| 9,413,730 B1 | 8/2016 | Narayan et al. |
| 9,485,149 B1 | 11/2016 | Traina et al. |
| 9,519,782 B2 | 12/2016 | Aziz et al. |
| 9,590,904 B2 | 3/2017 | Heo et al. |
| 9,699,070 B2 | 7/2017 | Davie et al. |
| 9,832,118 B1 | 11/2017 | Miller et al. |
| 9,871,720 B1 | 1/2018 | Tillotson |
| 10,135,675 B2 | 11/2018 | Yu et al. |
| 10,193,749 B2 | 1/2019 | Hira et al. |
| 10,228,959 B1 | 3/2019 | Anderson et al. |
| 10,326,744 B1 | 6/2019 | Nossik et al. |
| 10,333,959 B2 | 6/2019 | Katrekar et al. |
| 10,341,371 B2 | 7/2019 | Katrekar et al. |
| 10,348,767 B1 | 7/2019 | Lee et al. |
| 10,367,757 B2 | 7/2019 | Chandrashekhar et al. |
| 10,397,136 B2 | 8/2019 | Hira et al. |
| 10,484,302 B2 | 11/2019 | Hira et al. |
| 10,491,466 B1 | 11/2019 | Hira et al. |
| 10,491,516 B2 | 11/2019 | Ram et al. |
| 10,567,482 B2 | 2/2020 | Ram et al. |
| 10,601,705 B2 | 3/2020 | Hira et al. |
| 10,673,952 B1 | 6/2020 | Cohen et al. |
| 10,764,331 B2 | 9/2020 | Hoole et al. |
| 10,778,579 B2 | 9/2020 | Hira |
| 10,805,330 B2 | 10/2020 | Katrekar et al. |
| 2002/0062217 A1 | 5/2002 | Fujimori |
| 2002/0199007 A1 | 12/2002 | Clayton et al. |
| 2007/0186281 A1 | 8/2007 | McAlister |
| 2007/0226795 A1 | 9/2007 | Conti et al. |
| 2007/0256073 A1 | 11/2007 | Troung et al. |
| 2008/0104692 A1 | 5/2008 | McAlister |
| 2008/0225888 A1 | 9/2008 | Valluri et al. |
| 2009/0254973 A1* | 10/2009 | Kwan ............... H04L 63/1408 726/2 |
| 2010/0037311 A1 | 2/2010 | He et al. |
| 2010/0112974 A1 | 5/2010 | Sahai et al. |
| 2010/0318609 A1 | 12/2010 | Lahiri et al. |
| 2011/0317703 A1 | 12/2011 | Dunbar et al. |
| 2012/0082063 A1 | 4/2012 | Fujita |
| 2012/0250682 A1 | 10/2012 | Vincent et al. |
| 2013/0044636 A1 | 2/2013 | Koponen et al. |
| 2013/0044641 A1 | 2/2013 | Koponen et al. |
| 2013/0044763 A1 | 2/2013 | Koponen et al. |
| 2013/0058208 A1 | 3/2013 | Pfaff et al. |
| 2013/0058335 A1 | 3/2013 | Koponen et al. |
| 2013/0060928 A1 | 3/2013 | Shao |
| 2013/0125230 A1 | 5/2013 | Koponen et al. |
| 2013/0152076 A1 | 6/2013 | Patel |
| 2013/0198740 A1 | 8/2013 | Arroyo et al. |
| 2013/0263118 A1 | 10/2013 | Kannan et al. |
| 2013/0287026 A1 | 10/2013 | Davie |
| 2013/0297768 A1 | 11/2013 | Singh |
| 2013/0304903 A1 | 11/2013 | Mick et al. |
| 2013/0318219 A1 | 11/2013 | Kancherla |
| 2013/0346585 A1 | 12/2013 | Ueno |
| 2014/0010239 A1 | 1/2014 | Xu et al. |
| 2014/0052877 A1 | 2/2014 | Mao |
| 2014/0108665 A1 | 4/2014 | Arora et al. |
| 2014/0143853 A1 | 5/2014 | Onodera |
| 2014/0156818 A1 | 6/2014 | Hunt |
| 2014/0192804 A1 | 7/2014 | Ghanwani et al. |
| 2014/0226820 A1 | 8/2014 | Chopra et al. |
| 2014/0241247 A1 | 8/2014 | Kempf et al. |
| 2014/0245420 A1 | 8/2014 | Tidwell et al. |
| 2014/0280961 A1 | 9/2014 | Martinez et al. |
| 2014/0317677 A1 | 10/2014 | Vaidya et al. |
| 2014/0334495 A1 | 11/2014 | Stubberfield et al. |
| 2014/0337500 A1 | 11/2014 | Lee |
| 2014/0376560 A1 | 12/2014 | Senniappan et al. |
| 2015/0009995 A1 | 1/2015 | Gross, IV et al. |
| 2015/0016286 A1 | 1/2015 | Ganichev et al. |
| 2015/0016460 A1 | 1/2015 | Zhang et al. |
| 2015/0043383 A1 | 2/2015 | Farkas et al. |
| 2015/0052522 A1 | 2/2015 | Chanda et al. |
| 2015/0052525 A1 | 2/2015 | Raghu |
| 2015/0063360 A1 | 3/2015 | Thakkar et al. |
| 2015/0063364 A1 | 3/2015 | Thakkar et al. |
| 2015/0085870 A1 | 3/2015 | Narasimha et al. |
| 2015/0096011 A1 | 4/2015 | Watt |
| 2015/0098465 A1 | 4/2015 | Pete et al. |
| 2015/0103838 A1 | 4/2015 | Zhang et al. |
| 2015/0106804 A1 | 4/2015 | Chandrashekhar et al. |
| 2015/0124645 A1 | 5/2015 | Yadav et al. |
| 2015/0128245 A1 | 5/2015 | Brown et al. |
| 2015/0138973 A1 | 5/2015 | Kumar et al. |
| 2015/0139238 A1 | 5/2015 | Pourzandi et al. |
| 2015/0163137 A1 | 6/2015 | Kamble et al. |
| 2015/0163145 A1 | 6/2015 | Pettit et al. |
| 2015/0163192 A1 | 6/2015 | Jain et al. |
| 2015/0172075 A1 | 6/2015 | DeCusatis et al. |
| 2015/0172183 A1 | 6/2015 | DeCusatis et al. |
| 2015/0172331 A1 | 6/2015 | Raman |
| 2015/0263899 A1 | 9/2015 | Tubaltsev et al. |
| 2015/0263946 A1 | 9/2015 | Tubaltsev et al. |
| 2015/0263983 A1 | 9/2015 | Brennan et al. |
| 2015/0263992 A1 | 9/2015 | Kuch et al. |
| 2015/0264077 A1 | 9/2015 | Berger et al. |
| 2015/0271303 A1 | 9/2015 | Neginhal et al. |
| 2015/0281098 A1 | 10/2015 | Pettit et al. |
| 2015/0281274 A1 | 10/2015 | Masurekar et al. |
| 2015/0295731 A1 | 10/2015 | Bagepalli et al. |
| 2015/0295800 A1 | 10/2015 | Bala et al. |
| 2015/0304117 A1 | 10/2015 | Dong et al. |
| 2015/0326469 A1 | 11/2015 | Kern et al. |
| 2015/0339136 A1 | 11/2015 | Suryanarayanan et al. |
| 2015/0350059 A1 | 12/2015 | Chunduri et al. |
| 2015/0350101 A1 | 12/2015 | Sinha et al. |
| 2015/0373012 A1 | 12/2015 | Bartz et al. |
| 2015/0381493 A1 | 12/2015 | Bansal et al. |
| 2016/0014023 A1 | 1/2016 | He et al. |
| 2016/0055019 A1 | 2/2016 | Thakkar et al. |
| 2016/0072888 A1 | 3/2016 | Jung et al. |
| 2016/0094364 A1 | 3/2016 | Subramaniyam et al. |
| 2016/0094661 A1 | 3/2016 | Jain et al. |
| 2016/0105488 A1 | 4/2016 | Thakkar et al. |
| 2016/0124742 A1 | 5/2016 | Rangasamy et al. |
| 2016/0134418 A1 | 5/2016 | Liu et al. |
| 2016/0182567 A1 | 6/2016 | Sood et al. |
| 2016/0191304 A1 | 6/2016 | Muller |
| 2016/0198003 A1 | 7/2016 | Luft |
| 2016/0212049 A1 | 7/2016 | Davie |
| 2016/0226967 A1 | 8/2016 | Zhang et al. |
| 2016/0274926 A1 | 9/2016 | Narasimhamurthy et al. |
| 2016/0308762 A1 | 10/2016 | Teng et al. |
| 2016/0337329 A1 | 11/2016 | Sood et al. |
| 2016/0352623 A1 | 12/2016 | Jayabalan et al. |
| 2016/0352682 A1 | 12/2016 | Chang et al. |
| 2016/0352747 A1 | 12/2016 | Khan et al. |
| 2016/0364575 A1 | 12/2016 | Caporal et al. |
| 2016/0380973 A1 | 12/2016 | Sullenberger et al. |
| 2017/0005923 A1 | 1/2017 | Babakian |
| 2017/0006053 A1 | 1/2017 | Greenberg et al. |
| 2017/0034129 A1 | 2/2017 | Sawant et al. |
| 2017/0034198 A1 | 2/2017 | Powers et al. |
| 2017/0060628 A1 | 3/2017 | Tarasuk-Levin et al. |
| 2017/0078248 A1 | 3/2017 | Bian et al. |
| 2017/0091458 A1 | 3/2017 | Gupta et al. |
| 2017/0091717 A1 | 3/2017 | Chandraghatgi et al. |
| 2017/0093646 A1 | 3/2017 | Chanda et al. |
| 2017/0097841 A1 | 4/2017 | Chang et al. |
| 2017/0099188 A1 | 4/2017 | Chang et al. |

(56) References Cited

U.S. PATENT DOCUMENTS

| | | | |
|---|---|---|---|
| 2017/0104365 A1 | 4/2017 | Ghosh et al. | |
| 2017/0111230 A1 | 4/2017 | Srinivasan et al. | |
| 2017/0118115 A1 | 4/2017 | Tsuji | |
| 2017/0126552 A1 | 5/2017 | Pfaff et al. | |
| 2017/0142012 A1 | 5/2017 | Thakkar et al. | |
| 2017/0149582 A1 | 5/2017 | Cohn et al. | |
| 2017/0163442 A1 | 6/2017 | Shen et al. | |
| 2017/0163599 A1* | 6/2017 | Shen ................... | G06F 9/45558 |
| 2017/0195217 A1 | 7/2017 | Parasmal et al. | |
| 2017/0222928 A1 | 8/2017 | Johnsen et al. | |
| 2017/0223518 A1 | 8/2017 | Upadhyaya et al. | |
| 2017/0230241 A1 | 8/2017 | Neginhal et al. | |
| 2017/0279826 A1 | 9/2017 | Mohanty et al. | |
| 2017/0289060 A1 | 10/2017 | Aftab et al. | |
| 2017/0302529 A1 | 10/2017 | Agarwal et al. | |
| 2017/0310580 A1 | 10/2017 | Caldwell et al. | |
| 2017/0317972 A1* | 11/2017 | Bansal ................ | H04L 61/2507 |
| 2017/0324848 A1 | 11/2017 | Johnsen et al. | |
| 2017/0331746 A1 | 11/2017 | Qiang | |
| 2017/0359304 A1 | 12/2017 | Benny et al. | |
| 2018/0006943 A1 | 1/2018 | Dubey | |
| 2018/0007002 A1 | 1/2018 | Landgraf | |
| 2018/0013791 A1 | 1/2018 | Healey et al. | |
| 2018/0026873 A1 | 1/2018 | Cheng et al. | |
| 2018/0026944 A1 | 1/2018 | Phillips | |
| 2018/0027012 A1 | 1/2018 | Srinivasan et al. | |
| 2018/0027079 A1 | 1/2018 | Ali et al. | |
| 2018/0053001 A1 | 2/2018 | Folco et al. | |
| 2018/0062880 A1 | 3/2018 | Yu et al. | |
| 2018/0062881 A1 | 3/2018 | Chandrashekhar et al. | |
| 2018/0062917 A1 | 3/2018 | Chandrashekhar et al. | |
| 2018/0062923 A1 | 3/2018 | Katrekar et al. | |
| 2018/0062933 A1 | 3/2018 | Hira et al. | |
| 2018/0063036 A1 | 3/2018 | Chandrashekhar et al. | |
| 2018/0063086 A1 | 3/2018 | Hira et al. | |
| 2018/0063087 A1 | 3/2018 | Hira et al. | |
| 2018/0063176 A1 | 3/2018 | Katrekar et al. | |
| 2018/0063193 A1 | 3/2018 | Chandrashekhar et al. | |
| 2018/0077048 A1 | 3/2018 | Kubota et al. | |
| 2018/0083923 A1 | 3/2018 | Bian et al. | |
| 2018/0115586 A1 | 4/2018 | Chou et al. | |
| 2018/0139123 A1 | 5/2018 | Qiang | |
| 2018/0197122 A1 | 7/2018 | Kadt et al. | |
| 2018/0336158 A1 | 11/2018 | Iyer et al. | |
| 2019/0037033 A1 | 1/2019 | Khakimov et al. | |
| 2019/0068493 A1 | 2/2019 | Ram et al. | |
| 2019/0068500 A1 | 2/2019 | Hira | |
| 2019/0068689 A1 | 2/2019 | Ram et al. | |
| 2019/0097838 A1 | 3/2019 | Sahoo et al. | |
| 2019/0173757 A1 | 6/2019 | Hira et al. | |
| 2019/0173780 A1 | 6/2019 | Hira et al. | |
| 2019/0306185 A1 | 10/2019 | Katrekar et al. | |
| 2020/0028758 A1 | 1/2020 | Tollet et al. | |
| 2020/0067733 A1 | 2/2020 | Hira et al. | |
| 2020/0067734 A1 | 2/2020 | Hira et al. | |
| 2020/0177670 A1 | 6/2020 | Ram et al. | |
| 2020/0351254 A1 | 11/2020 | Xiong et al. | |

FOREIGN PATENT DOCUMENTS

| | | | |
|---|---|---|---|
| CN | 102255934 A | 11/2011 | |
| CN | 105099953 A | 11/2015 | |
| CN | 103036919 B | 12/2015 | |
| CN | 105379227 A | 3/2016 | |
| CN | 106165358 A | 11/2016 | |
| CN | 107534603 A | 1/2018 | |
| EP | 1742430 A1 | 1/2007 | |
| JP | 2014075731 A | 4/2014 | |
| JP | 2015165700 A | 9/2015 | |
| WO | 2015068255 A1 | 5/2015 | |
| WO | 2015142404 A1 | 9/2015 | |
| WO | 2016159113 A1 | 10/2016 | |
| WO | 2018044341 A1 | 3/2018 | |
| WO | 2019040720 A1 | 2/2019 | |
| WO | WO-2019040720 A1 * | 2/2019 | ............ H04L 45/64 |
| WO | 2019046071 A1 | 3/2019 | |
| WO | 2019112704 A1 | 6/2019 | |
| WO | 2020005540 A1 | 1/2020 | |
| WO | 2020041074 A1 | 2/2020 | |

OTHER PUBLICATIONS

Author Unknown, "Network Controller," Dec. 16, 2014, 4 pages, available at: https://web.archive.org/web/20150414112014/https://technet.microsoft.com/en-us/library/dn859239.aspx.

Koponen, Teemu, et al., "Network Virtualization in Multi-tenant Datacenters," Proceedings of the 11th USENIX Symposium on Networked Systems Design and Implementation (NSDI'14), Apr. 2-4, 2014, 15 pages, Seattle, WA, USA.

Non-Published commonly Owned U.S. Appl. No. 15/831,369 (N671.02), filed Dec. 4, 2017, 47 pages, Nicira Inc.

Non-Published commonly Owned U.S. Appl. No. 15/831,372 (N671.01), filed Dec. 4, 2017, 47 pages, Nicira Inc.

Sunliang, Huang, "Future SDN-based Data Center Network," Nov. 15, 2013, 5 pages, ZTE Corporation, available at http://wwwen.zte.com.cn/endata/magazine/ztetechnologies/2013/no6/articles/201311/t20131115_412737.html.

Wenjie, Zhu (Jerry), "Next Generation Service Overlay Networks," IEEE P1903 NGSON (3GPP Draft), Aug. 22, 2014, 24 pages, IEEE.

PCT International Search Report and Written Opinion dated Aug. 29, 2019 for commonly owned International Patent Application PCT/US2019/036644, 13 pages, International Searching Authority (EPO).

Firestone, Daniel, "VFP: A Virtual Switch Platform for Host SDN in the Public Cloud," 14th USENIX Symposium on Networked Systems Design and Implementation, Mar. 27-29, 2017, 15 pages, USENIX, Boston, MA, USA.

Non-Published Commonly Owned International Patent Application PCT/US19/36644, filed Jun. 12, 2019, 28 pages, VMware, Inc.

Non-Published commonly Owned U.S. Appl. No. 16/447,872 (N424.02.C1), filed Jun. 20, 2019, 124 pages, Nicira, Inc.

Black, David, et al., "An Architecture for Data Center Network Virtualization Overlays (NVO3) [draft-ietf-nvo3-arch-08]," Sep. 20, 2016, 34 pages, IEIF.

Church, Mark, "Docker Reference Architecture: Designing Scalable, Portable Docker Container Networks," Article ID: KB000801, Jun. 20, 2017, 36 pages, retrieved from https://success.docker.com/article/networking.

Fernando, Rex, et al., "Service Chaining using Virtual Networks with BGP," Internet Engineering Task Force, IEIF, Jul. 7, 2015, 32 pages, Internet Society (ISOC), Geneva, Switzerland, available at https://tools.ietf.org/html/draft-fm-bess-service-chaining-01.

Lasserre, Marc, et al., "Framework for Data Center (DC) Network Virtualization," RFC 7365, Oct. 2014, 26 pages, IETF.

Le Bigot, Jean-Tiare, "Introduction to Linux Namespaces—Part 5: NET," Jan. 19, 2014, 6 pages, retrieved from https://blog.yadutaf.fr/2014/01/19/introduction-to-linux-namespaces-part-5-net.

Merkel, Dirk, "Docker: Lightweight Linux Containers for Consistent Development and Deployment," Linux Journal, May 19, 2014, 16 pages, vol. 2014—Issue 239, Belltown Media, Houston, USA.

Singla, Ankur, et al., "Architecture Documentation: OpenContrail Architecture Document," Jan. 24, 2015, 42 pages, OpenContrail.

Zhang, Zhe, et al., "Lark: Bringing Network Awareness to High Throughput Computing," 15th IEEE/ACM International Symposium on Cluster, Cloud and Grid Computing, May 4-7, 2015, 10 pages, IEEE, Shenzhen, China.

Lee, Wonhyuk, et al., "Micro-Datacenter Management Architecture for Mobile Wellness Information," 2014 International Conference on IT Convergence and Security, Oct. 28-30, 2014, 4 pages, IEEE, Beijing, China.

Ling, Lu, et al., "Hybrid Cloud Solution Based on SDN Architecture," Collection of Cloud Computing Industry Application Cases, Dec. 31, 2016, 20 pages, Issue 2, China Academic Journal Publishing House. [English translation of document generated from www.onlinedoctranslator.com].

Suen, Chun-Hui, et al., "Efficient Migration of Virtual Machines between Public and Private Cloud," 2011 IEEE Third International (56) References Cited

OTHER PUBLICATIONS

Conference on Cloud Computing Technology and Science, Nov. 29-Dec. 1, 2011, 5 pages, IEEE, Athens, Greece.
Zheng, Guo, et al., "Study and Development of Private Cloud," Scientific View, Sep. 30, 2016, 2 pages. [English translation of abstract generated from Google Translate].

* cited by examiner

MANAGED FORWARDING ELEMENT DETECTING INVALID PACKET ADDRESSES

BACKGROUND

Public datacenters provide companies with the ability to expand or move their networks out of their own private datacenters, thereby reducing the expense, administration, and other burdens required with operation and maintenance of physical servers. However, public datacenters do not allow their tenants to directly control the virtualization software, and they may not have as robust or transparent security capabilities. These limitations make tenant machines in a public datacenter vulnerable to attacks such as IP spoofing, which can evade security measures implemented by the tenant.

BRIEF SUMMARY

Some embodiments of the invention provide a novel spoofed-packet detection method for a managed forwarding element (MFE) executing on a data compute node (DCN) such as a virtual machine (VM) that operates on a host computer in a public multi-tenant datacenter. The MFE implements a logical network that connects multiple other DCNs (e.g., operating on different host computers) within the public datacenter. The host computers implement an underlying public datacenter network, also referred to as an underlay network.

The method of some embodiments initially receives a data message (such as a packet) that is directed to the DCN. The data message in some embodiments includes both (i) a logical network source address (also referred to as a logical source address) that is stored in a first header of the data message and (ii) an underlay network source address (also referred to as an underlay source address) that is stored in an encapsulating second header of the data message. The MFE determines whether the logical source address is valid by using a mapping table that maps logical source addresses to underlay source addresses. If the data message's logical source address does not match the expected logical source address listed in the mapping table for the data message's underlay source address, the MFE drops the packet.

In some embodiments, the MFE determines whether the logical source address is valid by first identifying an entry of the mapping table that corresponds to the logical source address. The identified mapping table entry specifies a valid underlay source address associated with the logical source address and the MFE determines whether the underlay source address of the data message matches the valid source address specified in the mapping table entry. If the addresses match, then the logical source address of the data message is valid, and the data message is forwarded to the logical destination address.

Within the logical network, any DCN may send data messages to any other DCN. In some embodiments, these data messages are originated from and directed to a workload application executing on the DCN with the MFE. When the MFE determines (using the mapping table) that the logical source address of a received data message is valid, the MFE forwards the data message to the workload application executing on the same DCN.

The logical source address of the data message is an address that corresponds to a workload application executing on the DCN from which the data message originated. If the MFE determines that the logical source address of the data message is valid (i.e., that the underlay source address of the data message matches the valid source address from the mapping table), then this indicates that the data message was genuinely sent from the workload application on the source DCN to the receiving DCN. If the logical source address of the data message is invalid (i.e., the underlay source address of the data message does not match the valid source address from the mapping table), then the data message may have been sent from a DCN that has been compromised by an attacker. Such a compromised DCN may be impersonating the other DCN to direct malicious traffic to the receiving DCN, and the packet will therefore be dropped.

In some embodiments, the mapping table is distributed to the DCN by a public cloud gateway controller, also referred to as a gateway controller. The gateway controller configures the DCN to implement the logical network and to use the mapping table for source address validation. The gateway controller operates in some embodiments on a different host computer than the host computer of the DCN, and also manages other DCNs operating on other host computers in the public datacenter. The gateway controller and the DCNs form a virtual private cloud (VPC) for a tenant of the public datacenter in some embodiments.

A controller agent also executes on the DCN in some embodiments, alongside the MFE. The controller agent receives the mapping table, as well as configuration data for the logical network, from the gateway controller. The controller agent directly configures the MFE to (1) implement the logical network using the logical network configuration data, and (2) utilize the mapping table to determine the validity of packets' source addresses.

A VPC in the public datacenter thus includes a gateway controller to manage multiple DCNs, with each DCN executing (i) an MFE to implement the logical network and (ii) a controller agent to configure each MFE (in addition to one or more applications that send and receive the data messages). The logical network may also span at least one private datacenter and other VPCs in the same public datacenter or other public datacenters. A central controller in a central controller cluster, which may be located in a private or a public datacenter, sends logical network configuration data to the gateway controller for a particular VPC. In some embodiments, the central controller also has access to MFEs operating on host computers in the private datacenter(s), which implement the logical network. The central controller can directly provide configuration data to these private datacenter MFEs. However, neither the central controller nor the gateway controller has access to the forwarding elements operating on the host computers in the public datacenter (e.g., in virtualization software of the host computers), since the administrator is a tenant of the public datacenter instead of the owner.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments of the invention provide a novel spoofed-packet detection method for a managed forwarding element (MFE) executing on a data compute node (DCN) such as a virtual machine (VM) that operates on a host computer in a public multi-tenant datacenter. The MFE implements a logical network that connects multiple other DCNs (e.g., operating on different host computers) within the public datacenter. The host computers implement an underlying public datacenter network, also referred to as an underlay network.

The method of some embodiments initially receives a data message (such as a packet) that is directed to the DCN. The data message in some embodiments includes both (i) a logical network source address (also referred to as a logical source address) that is stored in a first header of the data message and (ii) an underlay network source address (also referred to as an underlay source address) that is stored in an encapsulating second header of the data message. The MFE determines whether the logical source address is valid by using a mapping table that maps logical source addresses to underlay source addresses. If the data message's logical source address does not match the expected logical source address listed in the mapping table for the data message's underlay source address, the MFE drops the packet.

In some embodiments, the mapping table is distributed to the DCN by a public cloud gateway controller, also referred to as a gateway controller. The gateway controller configures the DCN to implement the logical network and to use the mapping table for source address validation. The gateway controller operates in some embodiments on a different host computer than the host computer of the DCN, and also manages other DCNs operating on other host computers in the public datacenter. The gateway controller and the DCNs form a virtual private cloud (VPC) for a tenant of the public datacenter in some embodiments.

Figure 1:
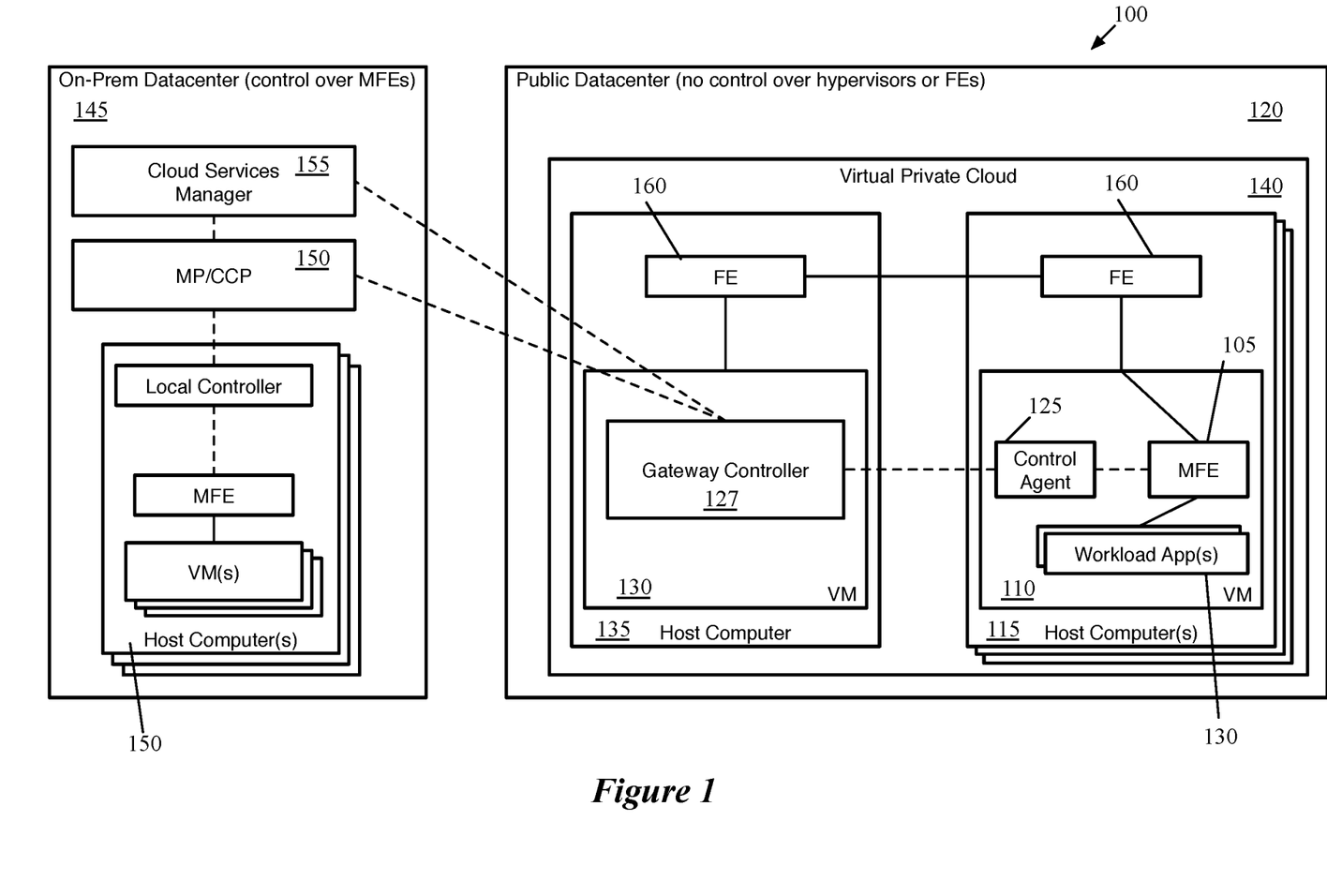
FIG. 1 conceptually illustrates a physical view of a logical network of some embodiments that spans (1) an on-premises private datacenter and (2) a virtual private cloud in a public datacenter.

FIG. 1 conceptually illustrates a network control system 100 that includes such a gateway controller for managing an MFE 105 that executes on a DCN (in this case a virtual machine (VM) 110) in a public datacenter 120 to implement a logical network. The VM 110 operates on one of numerous host computers 115 in the public datacenter 120. In practice, each VM actually operates on the host computer's virtualization software, which is not shown for clarity. In addition to the MFE 105, a local control agent 125 and any number of workload applications 130 also execute on the VM 110 in some embodiments. The control agent 125 directly configures the MFE 105 to implement the logical network, and the workload applications 130 (e.g., a web server, application server, database server, etc.) exchange data messages such as packets with other data compute nodes in the logical network.

In some embodiments, the logical network connects numerous member DCNs that operate on the virtualization software of host computers 115 in the public datacenter 120. Each public datacenter VM that is connected to the logical network also executes an MFE, local control agent, and workload applications. A person skilled in the art would understand that any number of DCNs such as VMs can be operated on a given host computer, even though only a single VM 110 is illustrated on host computer 115 in FIG. 1. In some embodiments, all member VMs in the public datacenter are managed by a public cloud gateway controller (PCG) 127 which executes on another VM 130 operating on host computer 135. Collectively, the host computers 115 and 135, on which the member VMs (such as VM 110) and the gateway controller 127 operate, form a virtual private cloud (VPC) 140 for the owner of the logical network, who is one tenant of the multi-tenant public datacenter 120.

In some embodiments, the logical network implemented by the MFE 105 also spans other physical locations, such as a private datacenter 145 on the tenant's premises. These locations are connected via a network external to the networks in the private and the public datacenters, such as a wide-area network (WAN) or a public network of networks such as the Internet. Logical networks that span public and private datacenters are described in further detail in U.S. Patent Publication 2018/0062917, which is incorporated herein by reference.

The network control system 100 also includes a central management plane/central control plane (MP/CCP) cluster 150 that resides in the private datacenter 145 in some embodiments, which provides data to local controllers on each of numerous private datacenter host computers 150. These local controllers directly manage MFEs that operate on the virtualization software (not shown) of the host computers 150, because the host computers 150 in the private datacenter are owned and managed by the public datacenter tenant. As shown, VMs (or other data compute nodes) operating on the host computers 150 connect to their local host computer MFEs in order to send and receive traffic over the logical network.

In some embodiments, a cloud services manager (CSM) 155 in the private datacenter directly deploys the VPC 140 in the public datacenter and configures the gateway controller 127. In some such embodiments, the MP/CCP 150 sends configuration information for the logical network to both the local controllers in the private datacenter 145 and to the gateway controller 127 in the public datacenter 120, to configure their respective MFEs to implement the logical network 100.

As mentioned, unlike the host computers 150 in the private datacenter, the tenant does not own or manage the host computers 115 in the public datacenter. Accordingly, the network control system 100 does not have direct access to the forwarding elements 160 of the public datacenter host computers 115. The VMs 110 on these host computers 115 are assigned IP addresses by the administrator of the public datacenter (separate from the logical network addresses) and the forwarding elements 160 implement an underlying public datacenter network (also referred to as an underlay network).

Figure 2:
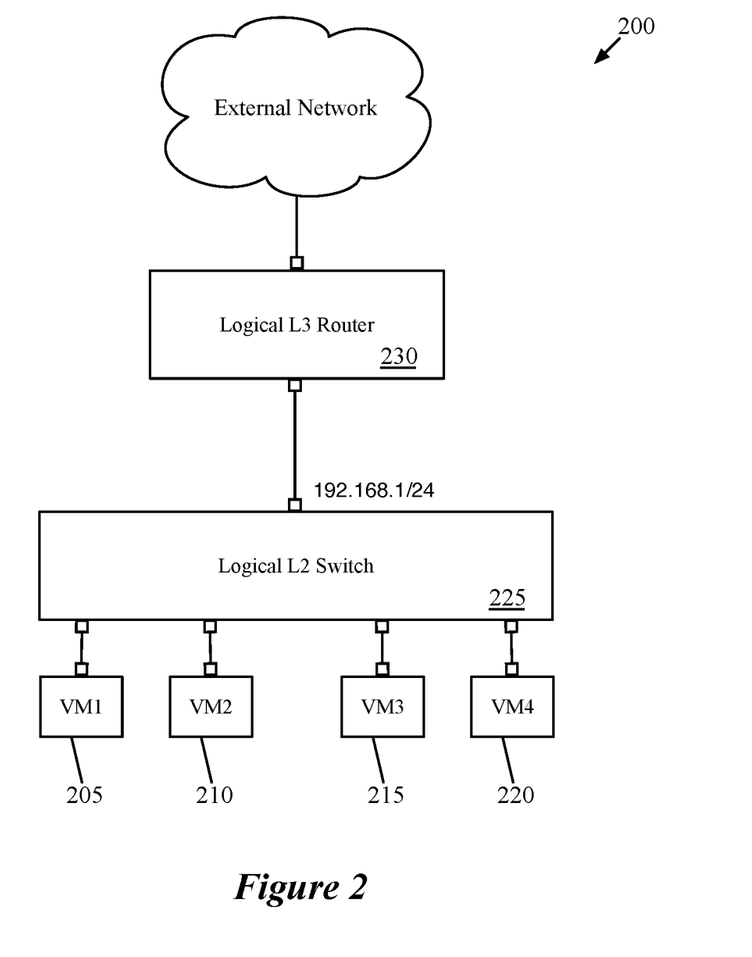
FIG. 2 conceptually illustrates the logical topology of the logical network in FIG. 1, as specified by an administrator in the management plane.

FIG. 2 conceptually illustrates the logical topology 200 of some embodiments of a logical network (e.g., the logical network implemented by the MFEs 105). In some embodiments, the tenant specifies this logical topology 200 at the management plane 150. In this example, four workload VMs 205-220 are connected to a logical L2 switch 225, which in turn is connected to a logical L3 router 230 that has an uplink to an external network. For simplicity's sake, only a single logical switch and logical router is shown. In some embodiments however, there may be multiple logical switches attached to the logical router 230, the logical router 230 may have multiple logical routing components, and there may be multiple tiers of logical routers. Multiple tiers of logical routers and routing components for a logical router are described in further detail in U.S. Pat. No. 9,787,605 titled "Logical Router with Multiple Routing Components," which is incorporated herein by reference. The logical switch 225 is assigned a subnet (e.g. 192.168.1/24), and the workload VMs are assigned addresses within the subnet. The subnet and these addresses are assigned to the VMs by the administrator via the network control system 100.

Figure 3:
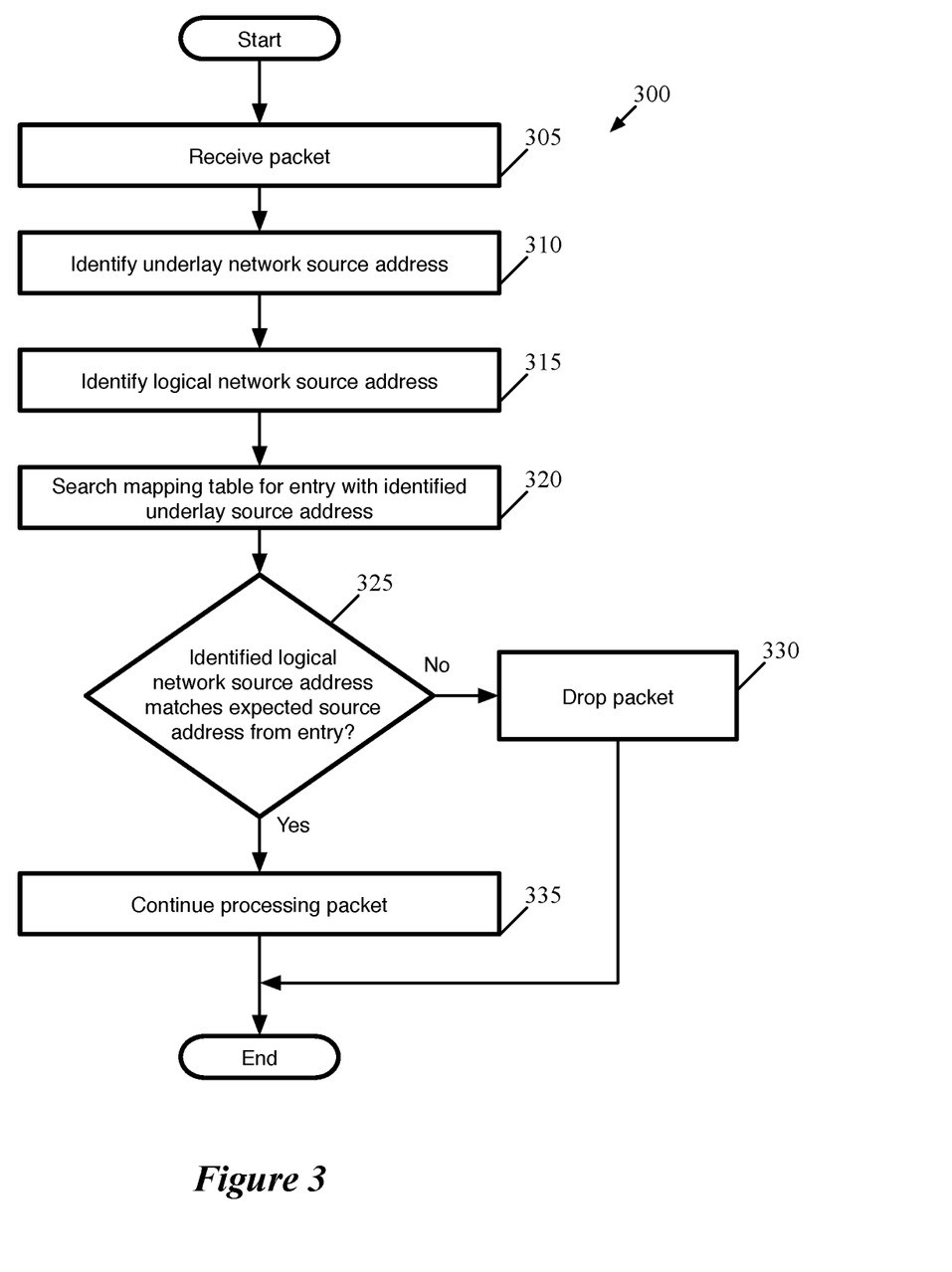
FIG. 3 conceptually illustrates a process performed by a managed forwarding element of a VM operating in a virtual private cloud in a public datacenter, to detect spoofed packets.

FIG. 3 conceptually illustrates a process 300 to detect spoofed packets in such an environment with MFEs implementing a logical network in a public datacenter. In some embodiments, the process 300 is performed by an MFE executing on a VM that operates in a public datacenter.

As shown, the process 300 begins by receiving (at 305) a packet. In some embodiments, the MFE receives the packet from an underlay forwarding element operating in virtualization software of the host computer on which the VM resides. This packet may have been sent from another VM on the same logical network (e.g., another VM in the same VPC as the VM on which the MFE executes).

The process 300 then identifies (at 310) the underlay network source address. In some embodiments, the packet is encapsulated using the underlay network addresses assigned to the VMs by the network administrator, which allow the forwarding elements of the host computers to forward the packet. The MFEs in the VMs are responsible, in some embodiments, for encapsulating and decapsulating the packets with these underlay network addresses.

The process 300 also identifies (at 315) the logical network source address of the packet. In some embodiments, this is the inner source address of the packet as generated by a workload application executing on the source VM. The MFE on the source VM will have received the packet with logical network addresses from the workload application and added the encapsulation addresses before forwarding the packet from the source VM.

Next, the process 300 searches (at 320) the mapping table for an entry with the identified underlay source address. The process 300 then determines (at 325) whether the identified logical network source address (in the packet) matches the expected logical network source address from the mapping table entry. This determines whether the logical network source address is a valid address for the VM that sent the packet (which is identified based on the underlay address). In some embodiments, the underlay address is assumed to be valid, as the datacenter-controlled forwarding elements will have verified this address. However, if the destination VM is compromised, that VM may be able to send packets with an incorrect source address (e.g., that of a different VM on the logical network with different privileges). Other embodiments search the mapping table for an entry for the logical network source address and perform the comparison for the underlay addresses.

When the logical source address of the packet matches the expected source address for the packet's underlay source address, the process 300 continues (at #0335) processing the packet. This further processing may include logical network processing, firewall processing based on the logical source and/or destination address, and delivery of the packet to the destination workload application on the DCN.

On the other hand, when the packet logical source address does not match the expected logical source address, the process 300 drops the packet. In this situation, the packet may have been sent from a VM that has been compromised by an attacker. Such a compromised VM may be impersonating another VM to evade a firewall or other security policy and direct malicious traffic to the receiving VM. The process 300 then ends.

Figure 4:
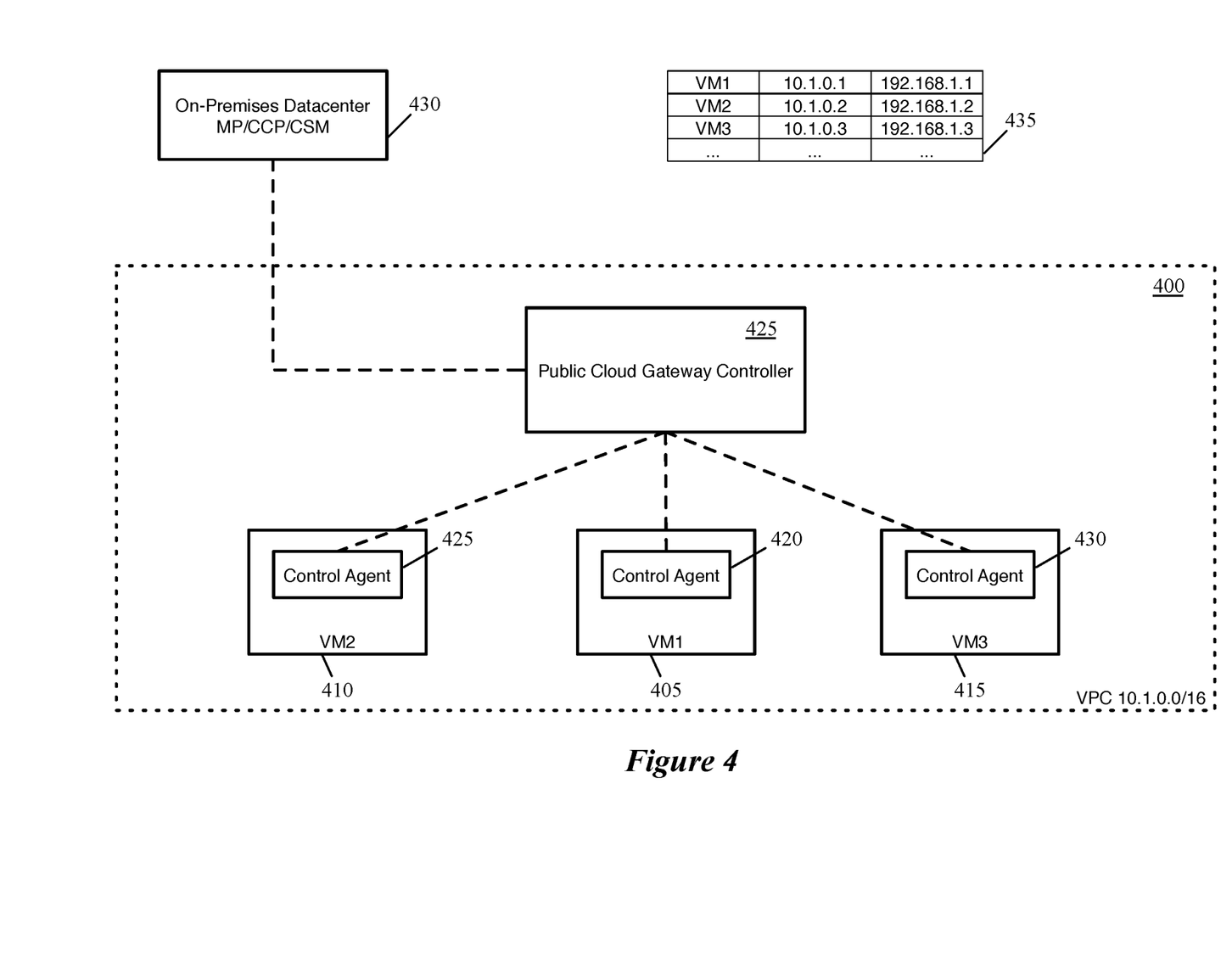
FIG. 4 illustrates an example of the control plane of a logical network that spans a private datacenter and a virtual private cloud located in a public datacenter.
Figure 5:
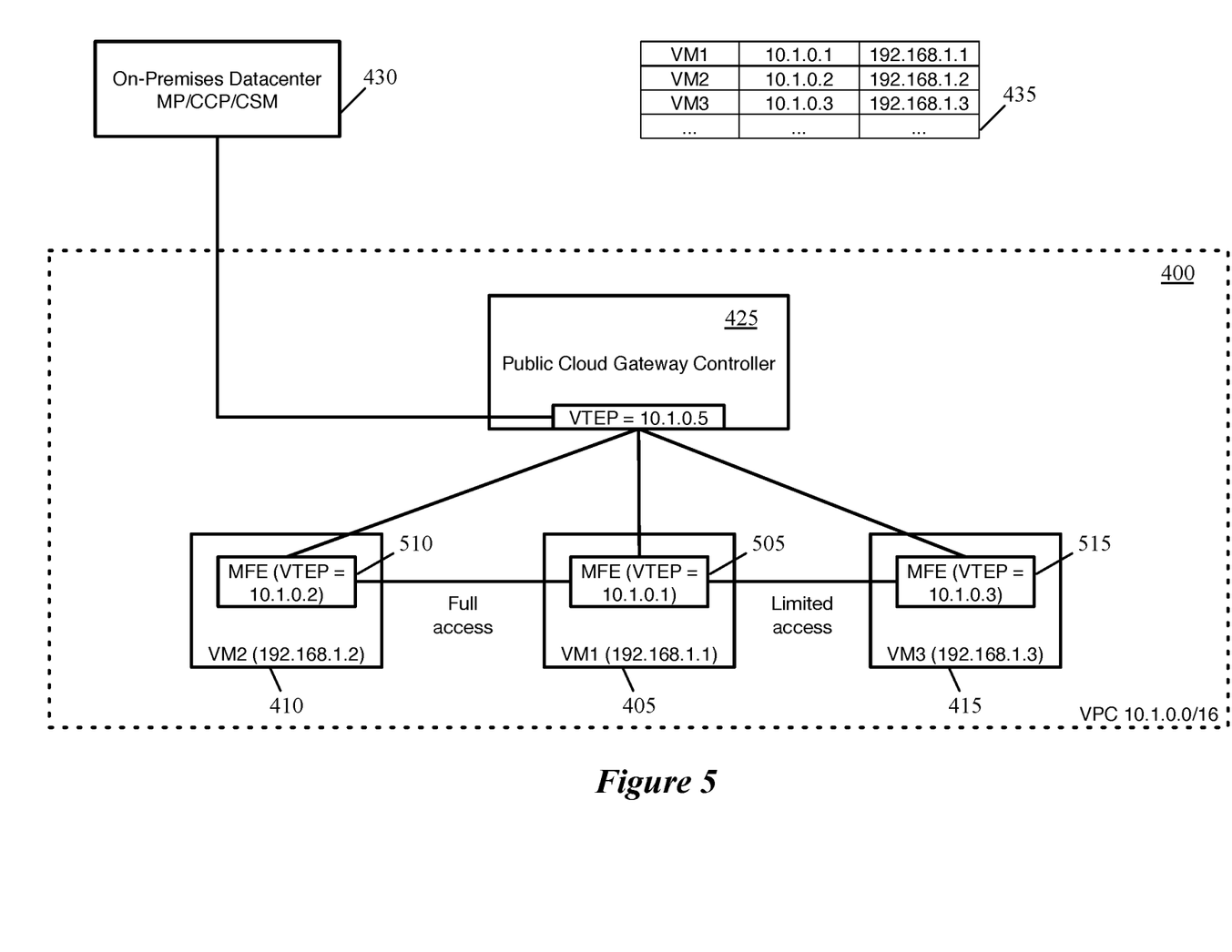
FIG. 5 illustrates an example of the data plane of a logical network that spans a private datacenter and a virtual private cloud located in a public datacenter, corresponding to the logical network in FIG. 4.
Figure 6:
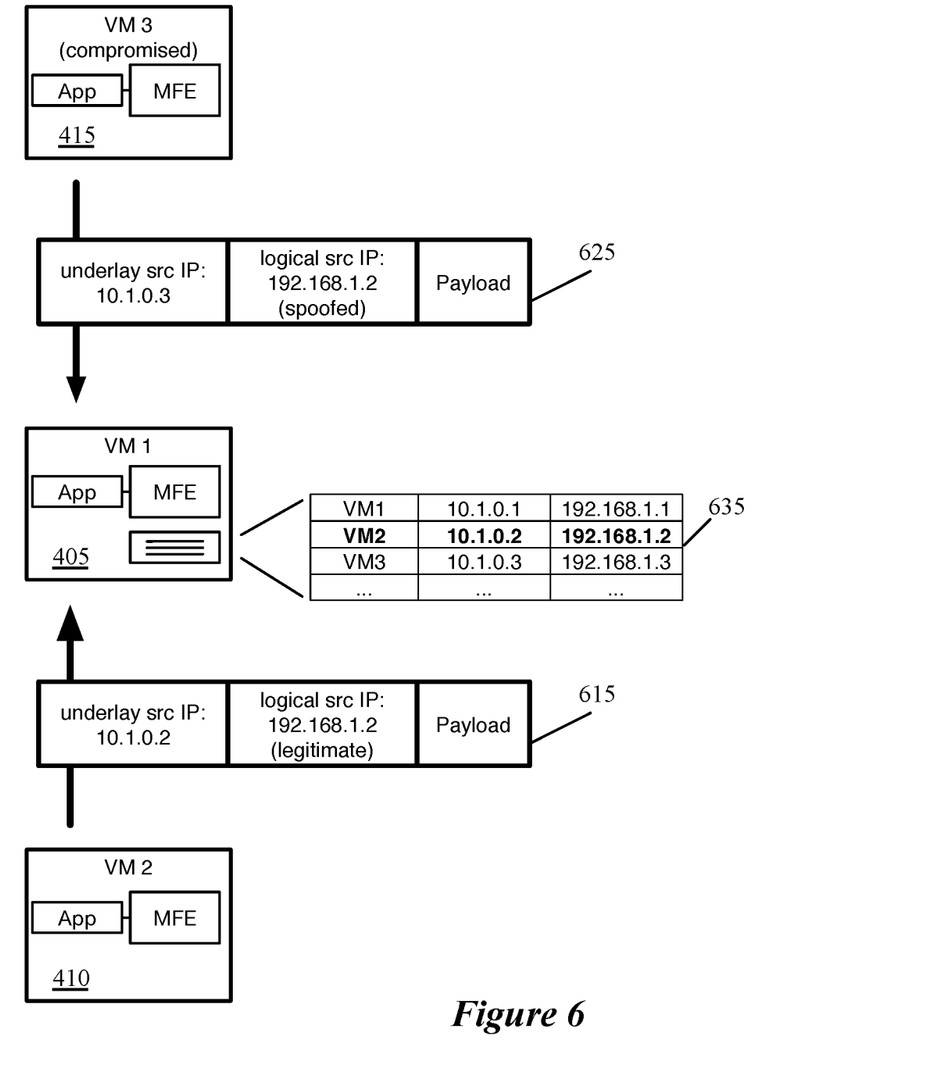
FIG. 6 illustrates an example of packets being sent to one VM from another, compromised VM in the virtual private cloud of FIGS. 4-5.

The process 300 will now be illustrated with a specific example by reference to FIGS. 4-6. FIG. 4 illustrates a VPC 400 located in a public datacenter, which includes three virtual machines 405-415 and a gateway controller 425 (which operates on a fourth VM in some embodiments), all managed by a MP/CCP/CSM 430 located outside the VPC (e.g., in a private on-premises datacenter). Control data connections are denoted by dashed lines in FIG. 4. Logical network configuration data is sent from the MP/CCP/CSM 430 to the gateway controller 425, which in turn shares the appropriate logical network configuration data with controller agents 420-430 executing on the respective VMs. The controller agents 420-430 then use the logical network configuration data to directly configure their local MFEs executing on each VM.

The VPC is assigned a subnet 10.1.0.0/16 by the public cloud administrator, and the logical switch (not shown) is assigned a subnet 192.168.1.0/24 by the logical network administrator. For the sake of simplicity, VMs 405-415 are assumed to be connected to the same logical switch, but similar concepts also apply when the VMs span multiple logical switches connected by one or more logical routers. The gateway controller 425 distributes a mapping table 435 to each VM 405-415. As shown, this mapping table 435 includes entries mapping each of the underlay network addresses of the VMs (the addresses 10.1.0.1, 10.1.0.2, etc.) to the corresponding logical network addresses for those VMs (192.168.1.1, 192.168.1.2, etc.).

FIG. 5 illustrates the same network as FIG. 4, showing data plane connections within the VPC. As shown, MFEs 505-515 execute on each VM 405-415, and each MFE has a virtual tunnel endpoint (VTEP) that uses the underlay address for that VM. The gateway controller 425 also operates a VTEP and maintains tunnels between itself and each VM. Each VM also maintains tunnels between itself and the other VMs, denoted by solid black lines (not all tunnels are shown in the figure, for clarity).

Each VM 405-415 is assigned an IP address in the logical network subnet. This is the source address for packets in the logical network that originate from the workload applications of the VM. Each VTEP associated with an MFE on is also assigned an IP address in the VPC subnet. The mapping of each VMs source address to its corresponding MFE's VTEP source address is recorded in the mapping table 435.

In the example of FIG. 5, the logical network configuration permits full access to VM1 (405) from VM2 (410), and only limited access to VM1 from VM3 (415). For example, if VM1 operates as a database server and VM2 operates as web server that requires access to the data in the database on VM1 while VM3 operates a different web application that does not need access to the data in the database on VM1, then the administrator could configure an access restriction for VM3 to VM1. These access restrictions may be implemented at each MFE in some embodiments using a distributed firewall, access control lists, and/or other methods of network security. In some embodiments, these access restrictions are configured within the logical network and are therefore implemented (e.g., as firewall rules) using the logical network addresses rather than the underlay addresses.

FIG. 6 illustrates two examples of packets being sent and received between the VMs 405-415 in VPC 400. As part of its configuration, VM1 (405) has received a copy 635 of the mapping table 435 from the gateway controller 425. As noted above, VM2 (410) is permitted full access to VM1, whereas VM3 (415) is only permitted limited access. These access restrictions are enforced by a distributed firewall that is configured to operate on each VM's MFE by their local control agent.

In the first example, VM1 (405) receives a packet 615 from VM2 (410). The packet 615 includes both (1) a logical network source address (192.168.1.2) as part of a first (inner) header of the data message and (2) an underlay network source address (10.1.0.2) as part of an encapsulation second (outer) header of the packet 615. The MFE on VM1 removes the underlay network address (e.g., as part of its VTEP processing) and stores this for its spoof protection evaluation.

The MFE then searches the copy of the mapping table 635 for an entry corresponding to the underlay network source address of the packet 615. The entry for the underlay address (10.1.0.2) of the packet 615 indicates that the corresponding logical network source address for this underlay address is 192.168.1.2. The MFE then compares this expected logical source address to the actual logical source address of the packet 615 and determines that these addresses match. As such, the MFE treats the packet 615 as valid for further processing (e.g., using the distributed firewall rules to determine that the packet is allowed and distributing the packet to the workload application).

In the second example, VM1 (405) receives another packet 625 originating from VM3 (415). However, VM3 (415) has been compromised by an attacker and is attempting to send unauthorized packets to the database server on VM1 (405). Because VM3 (415) has limited network connectivity with VM1 (405), enforced by the MFE of VM1, VM3 attempts to send malicious packets spoofing VM2 (i.e., appearing as though the packets are sent from VM2).

Accordingly, VM3 (415) sends a malicious packet 625 to VM1 using the logical source address 192.168.1.2 (the address of VM2) instead of the actual VM3 address of 192.168.1.3. However, because the attacker does not have access to the host computer forwarding element, the source underlay network address needs to be correct in order for the datacenter-controlled forwarding element at the host of VM3 to forward the packet to the forwarding element at the host of VM1.

When received by VM1 (405), the malicious packet 625 includes both (1) a logical network source address (192.168.1.2) as part of a first (inner) header of the data message and (2) an underlay network source address (10.1.0.3) as part of an encapsulation second (outer) header of the packet 625. The MFE on VM1 removes the underlay network address (e.g., as part of its VTEP processing) and stores this for its spoof protection evaluation.

The MFE then searches the copy of the mapping table 635 for an entry corresponding to the underlay network source address of the packet 625. The entry for the underlay address (10.1.0.3) of the packet 625 indicates that the corresponding logical network source address for this underlay address is 192.168.1.3. In this case, the expected logical source address (192.168.1.3) does not match the actual logical source address of the packet 625, and thus the MFE drops this packet. Without this additional check, the firewall would allow the packet because the logical packet would appear as though received from VM2.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
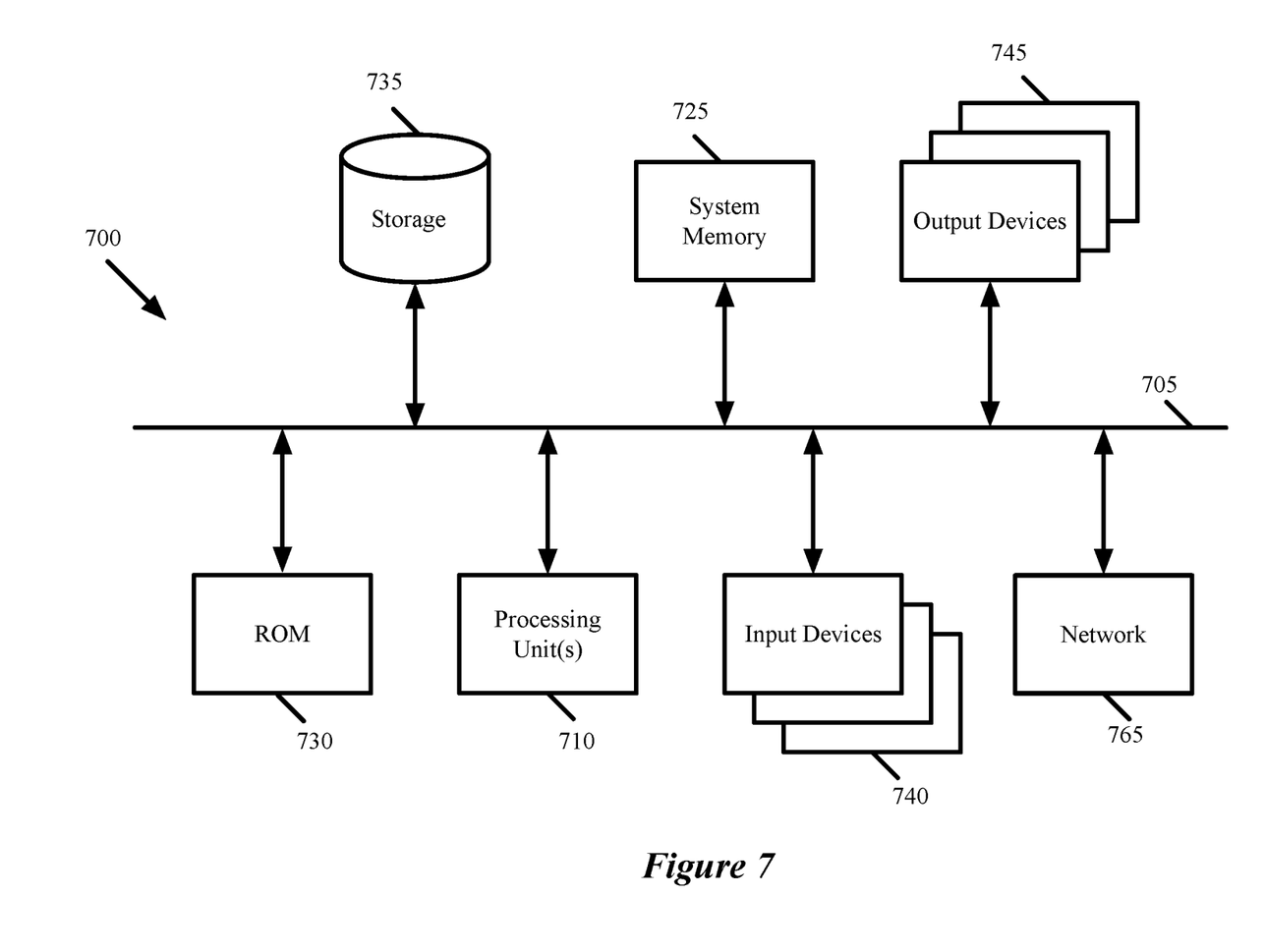
FIG. 7 conceptually illustrates an electronic system with which some embodiments of the invention are implemented.

FIG. 7 conceptually illustrates an electronic system 700 with which some embodiments of the invention are implemented. The electronic system 700 can be used to execute any of the control, virtualization, or operating system applications described above. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such as random-access memory. The system memory stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices enable the user to communicate information and select commands to the electronic system. The input devices 740 include alphanumeric keyboards and pointing devices (also called "cursor control devices"). The output devices 745 display images generated by the electronic system. The output devices include printers and display devices, such as cathode ray tubes (CRT) or liquid crystal displays (LCD). Some embodiments include devices such as a touchscreen that function as both input and output devices.

Finally, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system isolates the containers for different tenants and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESX hypervisor of VMware Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, FIG. 6 conceptually illustrates a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a managed forwarding element (MFE) executing on a data compute node (DCN) that operates on a host computer in a public datacenter, the MFE implementing a logical network that connects a plurality of DCNs within the public datacenter, a method of performing spoof guarding, the method comprising:
receiving a packet directed to the DCN, wherein the packet (i) has a logical network first source address and (ii) is encapsulated with a second source address associated with an underlying public datacenter network;
performing the spoof guarding operation by (i) determining whether the logical network first source address is a valid source address for the logical network for the packet based on a mapping table that maps logical network addresses to underlying public datacenter network addresses, and (ii) based on a determination that the logical network first source address is not a valid source address for the packet, dropping the packet as the packet uses an invalid network address for the logical network, said determining comprising:
identifying an entry of the mapping table for the logical network first source address;
identifying a third source address associated with the underlying public datacenter network that is a valid source address for the logical network first source address according to the mapping table entry; and
determining that the third source address does not match the second source address.

2. The method of claim 1, wherein the host computer is a first host computer, wherein the first host computer receives the mapping table from a network controller that (i) operates on a second host computer in the public datacenter and (ii) configures the MFE to implement the logical network.

3. The method of claim 2, wherein the network controller distributes the mapping table to a controller agent executing on the first DCN, said controller agent directly configuring the MFE to implement the logical network and to use the mapping table.

4. The method of claim 2, wherein the network controller operating on the second host computer is a first network controller that manages a plurality of MFEs operating in the public datacenter to implement the logical network, wherein the first network controller receives logical network configuration data from a second network controller operating in a second datacenter.

5. The method of claim 4, wherein:
the second network controller has access to and provides configuration data for managed forwarding elements operating in virtualization software of a plurality of host computers of the second datacenter, and
the second network controller does not have access to forwarding elements operating in virtualization software of the first and second host computers of the first datacenter.

6. The method of claim 1, wherein:
the DCN is a first DCN,
the logical network first source address is a logical network address for applications executing on a second DCN, and
the second source address is an address assigned to the second DCN by the public datacenter.

7. The method of claim 1, wherein a workload application executes on the DCN alongside the MFE, wherein the packet is directed to the workload application.

8. The method of claim 7, wherein the packet has a logical network first destination address associated with the workload application, and wherein the encapsulation includes a second destination address associated with the DCN on the underlying public datacenter network.

9. The method of claim 7, wherein when the logical network first source address is a valid source address for the packet, the MFE forwards the packet to the workload application.

10. The method of claim 1, wherein the third source address is an Internet Protocol (IP) address assigned by the public datacenter to a second DCN, wherein the packet is received from a third DCN that has been compromised by an attacker and is impersonating the second DCN to direct traffic to the first DCN.

11. A non-transitory machine readable medium storing a managed forwarding element (MFE) which when executed on a data compute node (DCN) operating on a host computer in a public datacenter implements a logical network that connects a plurality of DCNs within the public datacenter, the program comprising sets of instructions for:
receiving a packet directed to the DCN, wherein the packet (i) has a first logical network source address and (ii) is encapsulated with a second source address associated with an underlying public datacenter network;
performing the spoof guarding operation by (i) determining whether the logical network first source address is a valid source address for the logical network for the packet based on a mapping table that maps logical network addresses to underlying public datacenter network addresses and (ii) based on a determination that the logical network first source address is not a valid source address for the packet, dropping the packet as the packet uses an invalid network address for the logical network, said determining comprising:
identifying an entry of the mapping table for the logical network first source address;
identifying a third source address associated with the underlying public datacenter network that is a valid source address for the logical network first source address according to the mapping table entry; and
determining that the third source address does not match the second source address.

12. The non-transitory machine readable medium of claim 11, wherein the host computer is a first host computer, wherein the first host computer receives the mapping table from a network controller that (i) operates on a second host computer in the public datacenter and (ii) configures the MFE to implement the logical network.

13. The non-transitory machine readable medium of claim 12, wherein the network controller distributes the mapping table to a controller agent executing on the first DCN, said controller agent directly configuring the MFE to implement the logical network and to use the mapping table.

14. The non-transitory machine readable medium of claim 12, wherein:
- the network controller operating on the second host computer is a first network controller that manages a plurality of MFEs operating in the public datacenter to implement the logical network;
- the first network controller receives logical network configuration data from a second network controller operating in a second datacenter;
- the second network controller has access to and provides configuration data for managed forwarding elements operating in virtualization software of a plurality of host computers of the second datacenter; and
- the second network controller does not have access to forwarding elements operating in virtualization software of the first and second host computers of the first datacenter.

15. The non-transitory machine readable medium of claim 11, wherein:
- the DCN is a first DCN,
- the first logical network source address is a logical network address for applications executing on a second DCN, and
- the second source address is an address assigned to the second DCN by the public datacenter.

16. The non-transitory machine readable medium of claim 11, wherein a workload application executes on the DCN alongside the MFE, wherein the packet is directed to the workload application.

17. The non-transitory machine readable medium of claim 16, wherein the packet has a first logical network destination address associated with the workload application, and wherein the encapsulation includes a second destination address associated with the DCN on the underlying public datacenter network.

18. The non-transitory machine readable medium of claim 16, wherein when the first source address is a valid source address for the packet, the MFE forwards the packet to the workload application.

* * * * *